UNITED STATES PATENT OFFICE.

MARTIN FREUND, OF FRANKFORT-ON-THE-MAIN, GERMANY.

PROCESS FOR PREPARATION OF PHTHALIC-ACID SALTS OF COTARNIN AND PRODUCT RESULTING THEREFROM.

No. 892,414.      Specification of Letters Patent.      Patented July 7, 1908.

Application filed June 7, 1906. Serial No. 320,609. (Specimens.)

*To all whom it may concern:*

Be it known that I, MARTIN FREUND, a subject of the Emperor of Germany, and a resident of Frankfort-on-the-Main, Germany, have invented a new and useful Process for the Preparation of Phthalic-Acid Salts of Cotarnin and a Product Resulting Therefrom, of which the following is a specification.

This invention consists broadly in the treatment of cotarnin with phthalic acid anhydrid under suitable conditions and the acid cotarninphthalate produced by employing equal molecular proportions.

Anhydrids of monobasic organic acids are decomposed with the formation of acid amids by means of ammonia, and also by primary and secondary amins. In a wholly analogous manner anhydrids of dibasic acids act, being converted into amido acids. Thus phthalic acid anhydrid with ammonia yields:

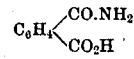

with ethyl anilin

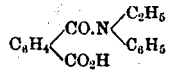

In a similar way it was to be expected that cotarnin a secondary base of the formula $C_{11}H_{11}O_4.NH.CH_3$, with phthalic acid anhydrid would yield the compound

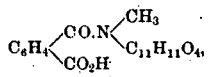

or the cotarnin salt of this acid. Unexpectedly there is obtained from one molecular proportion of phthalic acid anhydrid and two molecular proportion of cotarnin not the cotarnin salt of the substituted phthalamic acid but neutral cotarnin phthalate

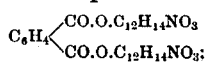

and from one molecular proportion of the anhydrid and one molecular proportion of the cotarnin the acid phthalate

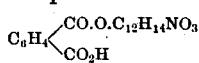

Since I understand that I am the first one to produce phthalic acid salts by treatment of cotarnin with phthalic-acid anhydrid, I do not wish to be understood as limiting myself in any way to the details of such treatment and would consider any details which fall within the scope of the appended claims to be the equivalents of these which I will now set forth as an example of the method of carrying out my invention.

*Preparation of the neutral phthalate.*—474 parts of cotarnin and 148 parts of finely powdered phthalic acid anhydrid are covered with absolute ether and stirred or shaken up until a portion taken out is completely and easily soluble in water. The product is then filtered off and freed from adhering ether in a vacuum.

*Preparation of the acid phthalate.*—148 parts finely powdered phthalic acid anhydrid are covered with absolute ether, thoroughly mixed for some time therewith, and then, while being constantly stirred or shaken up, 237 parts of cotarnin are introduced in portions into the mass as the reaction proceeds. As soon as a portion taken out is clearly soluble in warm water, the product is filtered.

The new product, cotarnin acid phthalate, may be recognized by the following characteristics: It is less soluble in cold water than the neutral phthalate of cotarnin and when heated it decomposed at about 130° centigrade. It is a micro crystalline powder of brimstone color having the following formula:

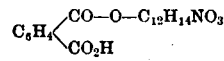

and decomposition at about 130° centigrade.

Having thus described my invention, I claim as new and desire to secure by Letters Patent:

1. The process for the preparation of phthalic acid salt of cotarnin by reaction of the same with phthalic acid anhydrid in an indifferent medium.

2. As a new article of manufacture acid cotarnin phthalate consisting in a microcrystalline powder of brimstone color decomposing at about 130° C. and having the following formula:

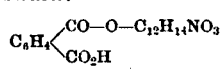

In testimony whereof, I have hereunto signed my name in the presence of two subscribing witnesses.

MARTIN FREUND.

Witnesses:
  JEAN GRUND,
  CARL GRUND.